(12) United States Patent
Hsu

(10) Patent No.: US 6,612,864 B2
(45) Date of Patent: Sep. 2, 2003

(54) LIGHTING STRING WITH EXTENDING LIGHTING STRUCTURE

(76) Inventor: Fu-Shien Hsu, 4F, No. 37, Lane 77, Sec. 2, Chung Shan North Road, Taipei (TW)

( * ) Notice: Subject to any disclaimer, the term of this patent is extended or adjusted under 35 U.S.C. 154(b) by 1 day.

(21) Appl. No.: 10/045,076

(22) Filed: Jan. 15, 2002

(65) Prior Publication Data

US 2003/0134523 A1 Jul. 17, 2003

(51) Int. Cl.[7] ............................................... H01R 11/00
(52) U.S. Cl. ......................................... 439/505; 439/56
(58) Field of Search ........................... 439/56, 505, 139, 439/502, 672; 360/249, 236, 252; 240/10 B, 13, 17, 141; 362/806, 252

(56) References Cited

U.S. PATENT DOCUMENTS

| | | | | |
|---|---|---|---|---|
| 3,727,044 A | * | 4/1973 | Monroy | 240/10 R |
| 3,767,910 A | * | 10/1973 | Harrigan | 240/10 |
| 4,667,276 A | * | 5/1987 | Cheng | 362/249 |
| 4,924,358 A | * | 5/1990 | Von Heck | 362/32 |
| 4,998,186 A | * | 3/1991 | Cocca | 362/103 |
| 6,227,679 B1 | * | 5/2001 | Zhang et al. | 362/236 |
| 6,319,056 B1 | * | 11/2001 | Schunk et al. | 439/505 |

* cited by examiner

Primary Examiner—Alexander Gilman
(74) Attorney, Agent, or Firm—Rosenberg, Klein & Lee

(57) ABSTRACT

The present invention relates to a lighting string with extending structure, which includes an electrical wire with several bulb assemblies and some lighting units connected by an extending wires. The lighting unit can emit light at a distance from the electrical wire of the lighting string that provides a special lighting effect with improvement. The lighting unit is also possible to connect with lighting fiber for further extension of light.

1 Claim, 4 Drawing Sheets

LIGHTING STRING WITH EXTENDING LIGHTING STRUCTURE

BACKGROUND OF THE INVENTION

A conventional lighting string usually includes an electrical wire, which connects with several bulb assemblies arranged in spaced intervals. When the lighting string is connected to a power source, the bulb assemblies will be lit, providing a decorative lighting effect. Since the bulb assemblies are connected in close proximity to the electrical wire, the decorative light is also centralized around those wires.

SUMMARY OF THE INVENTION

Accordingly, the primary object of the invention is to provide a lighting string with an extending lighting structure, wherein some lighting units are spaced far from the electrical wire. Now, the features and advantages of the present invention will be described in detail with reference to the accompanying drawings.

BRIEF DESCRIPTION OF ACCOMPANYING DRAWINGS

FIG. 1 exploded perspective view showing an extending lighting structure according to the present invention.

DETAILED DESCRIPTION OF PREFERRED EMBODIMENTS

Figure 1:
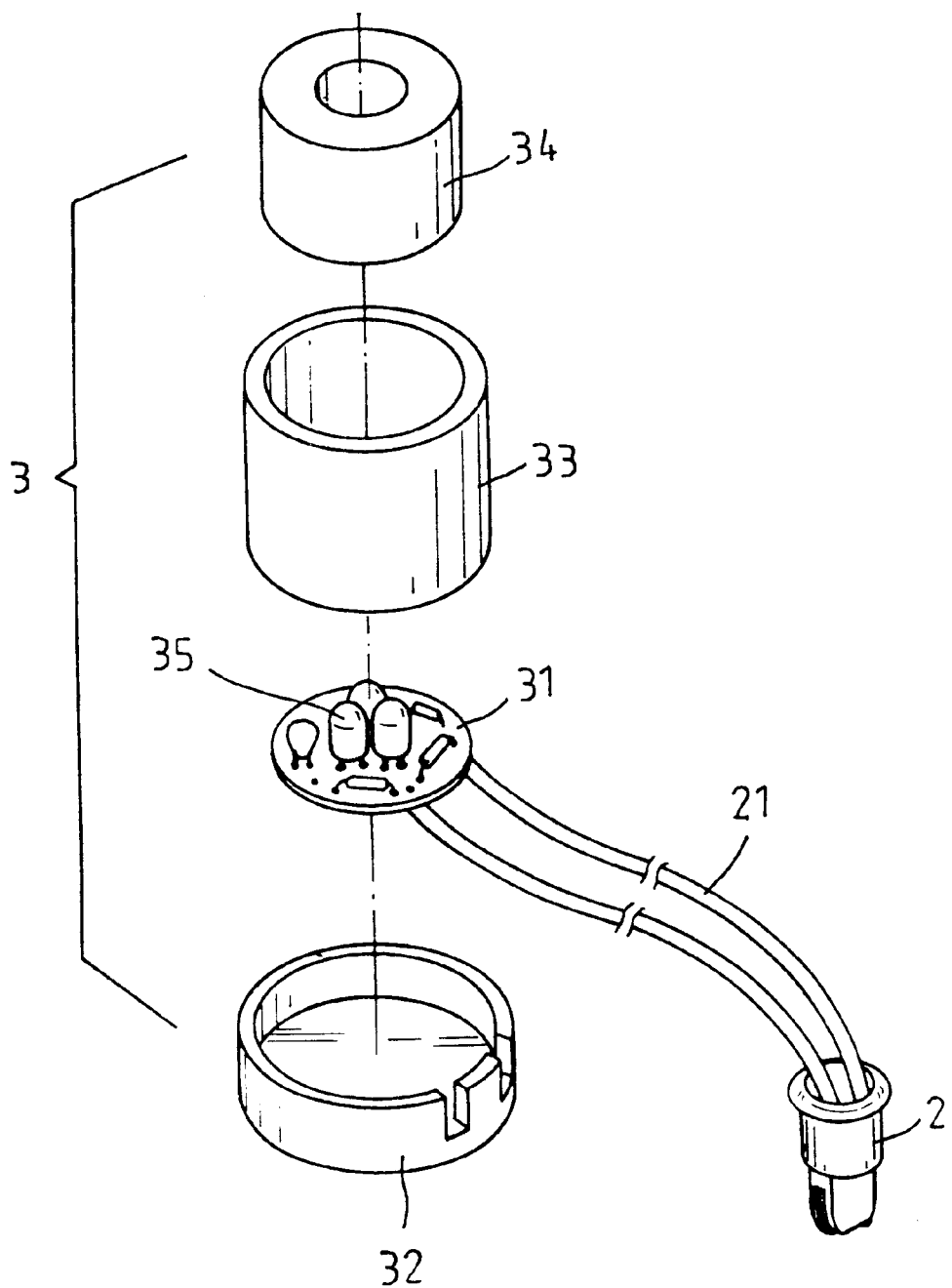
Figure 2:
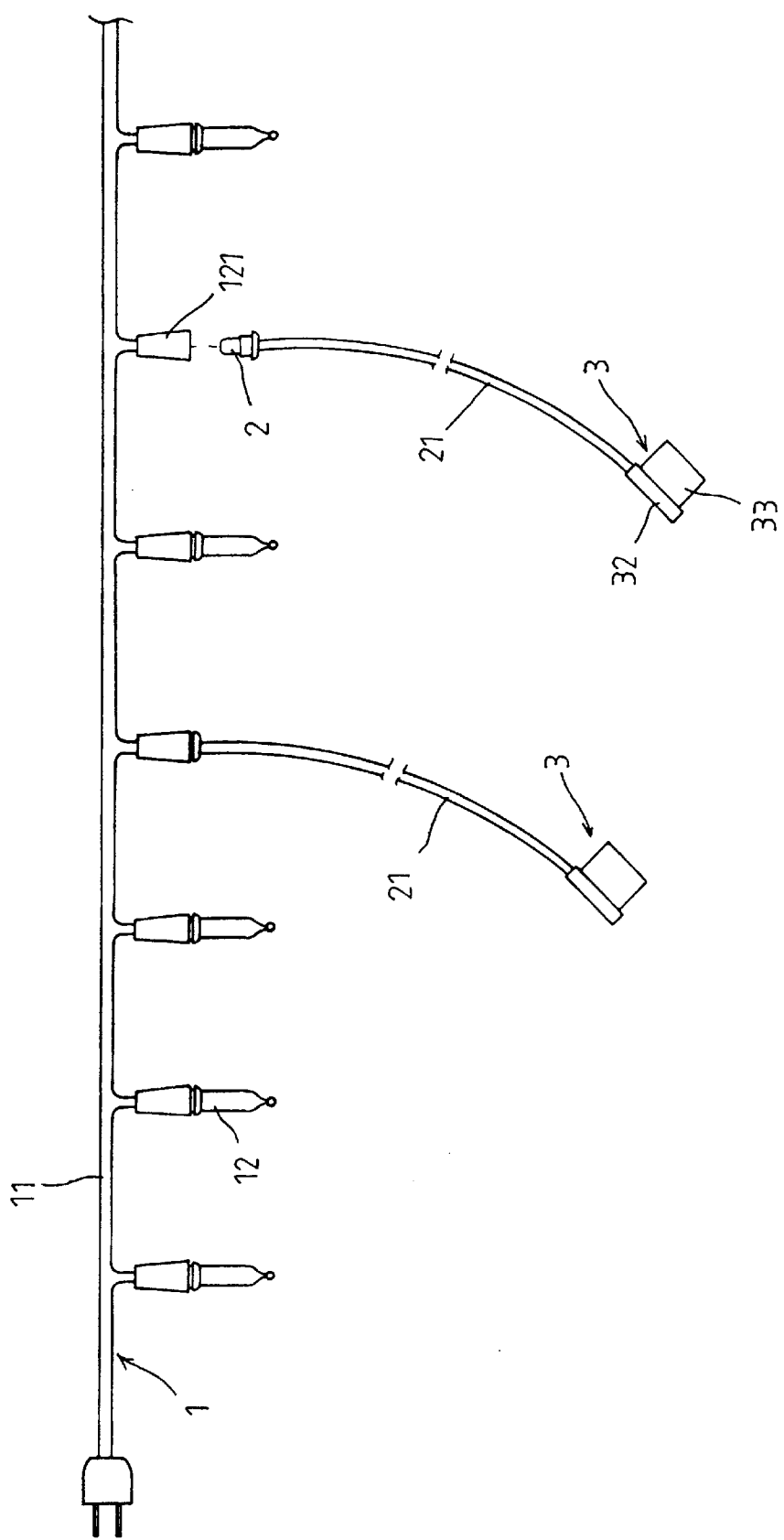
FIG. 2 is a plan view showing a lighting string with the extending structure according to the present invention.

Please refer to FIGS. 1 and 2, the present invention relates to a lighting string (1), which has an electrical wire (11) and several bulb assemblies (12) connected to the wire (11) at spaced intervals. Some of the bulb assemblies have only a bulb holder (121) for connecting with a connector (2) of an extending lighting structure. A pair of extending wires (21) each has one end connected with the connector (2) and the other end connected to an IC board (31) in a lighting unit (3). The lighting unit (3) includes a base (32) and a shell (33) to cover the IC board (31), which is provided with several bulbs (35). A sleeve (34) is received in the shell (33) above the bulbs (35).

Figure 3:
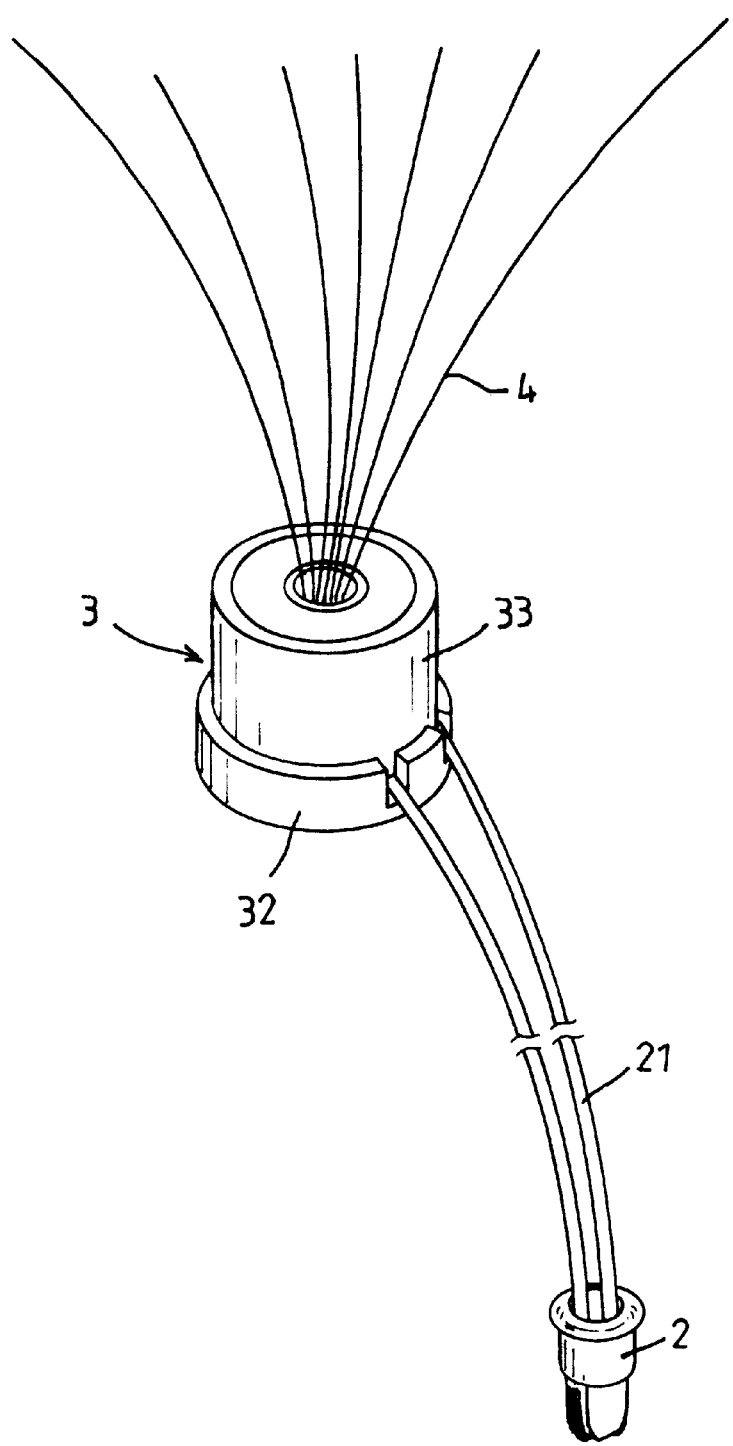
FIG. 3 is a perspective view showing an extending lighting structure connecting with a lighting fiber bunch according to the present invention.
Figure 4:
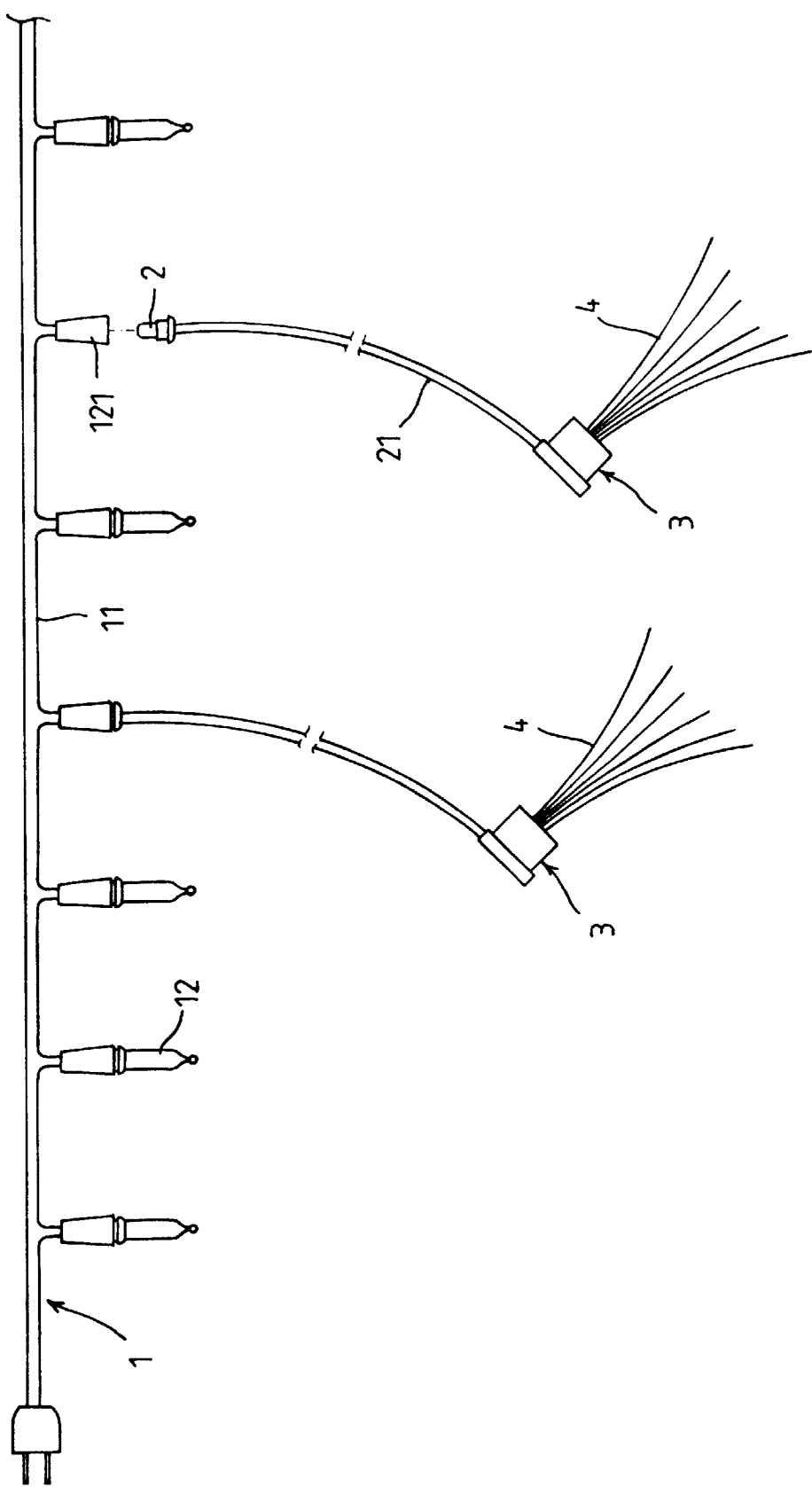
FIG. 4 is a plan view showing a lighting string with the extending structure of FIG. 3.

When the power is turned on, the current passes through the electrical wire (11) and the extending wires (21) to the IC board (31) that controls the bulbs (35) to light or to twinkle. The lighting units (3) are disposed far from the electrical wire (11) to provide a novel and different decorative lighting effect. In FIGS. 3 and 4, the present invention can be modified to include an optical fiber bunch (4) or a transparent patterned decoration in the sleeve (34). The optical fiber bunch (4) directs the light of the bulbs (35) to be emitted outward along each fiber, to obtain a new decoration.

What is claimed is:

1. A lighting string with an extended lighting structure comprising a plurality of bulb assemblies and a plurality of bulb holders electrically coupled to a longitudinally extended electrical wire and disposed in longitudinally spaced relationship, and a plurality of lighting units respectively connected to said plurality of bulb holders, each of said lighting units including (a) a circuit board having a plurality of bulbs connected thereto, (b) a pair of extending wires of predetermined length, each of said extending wires having a first end coupled to said circuit board, (c) a connector coupled to a second end of each of said extending wires for connection to a respective one of said bulb holders, (d) a base for receiving said circuit board therein, (e) a shell having a tubular contour with first and second open ends, said first open end of said shell being coupled to said base and covering said circuit board, and (f) a sleeve disposed in said second open end of said shell and having a centrally disposed and axially directed through bore formed therein, said through bore being in aligned relationship with said plurality of bulbs of said circuit board for centralizing light emitted therefrom, wherein said plurality of lighting units are respectively spaced from said longitudinally extended electrical wire by said predetermined length of said extending wires.

* * * * *

UNITED STATES PATENT AND TRADEMARK OFFICE
Certificate

Patent No. 6,612,864 B2                                       Patented: September 2, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Fu-Shien Hsu, Taipei, Taiwan; and John F. Cavanagh, Gainesville, Georgia (US).

Signed and Sealed this Thirtieth Day of May 2006.

PAULA A. BRADLEY
*Supervisory Patent Examiner*
Art Unit 2833